3,332,391
POSITION-INDICATING DEVICES
Gordon Raymond Robson, Leamington Spa, England, assignor to Automotive Products Company Limited, Leamington Spa, England
Filed Apr. 3, 1964, Ser. No. 357,252
Claims priority, application Great Britain, Apr. 23, 1963, 16,003/63
1 Claim. (Cl. 116—124)

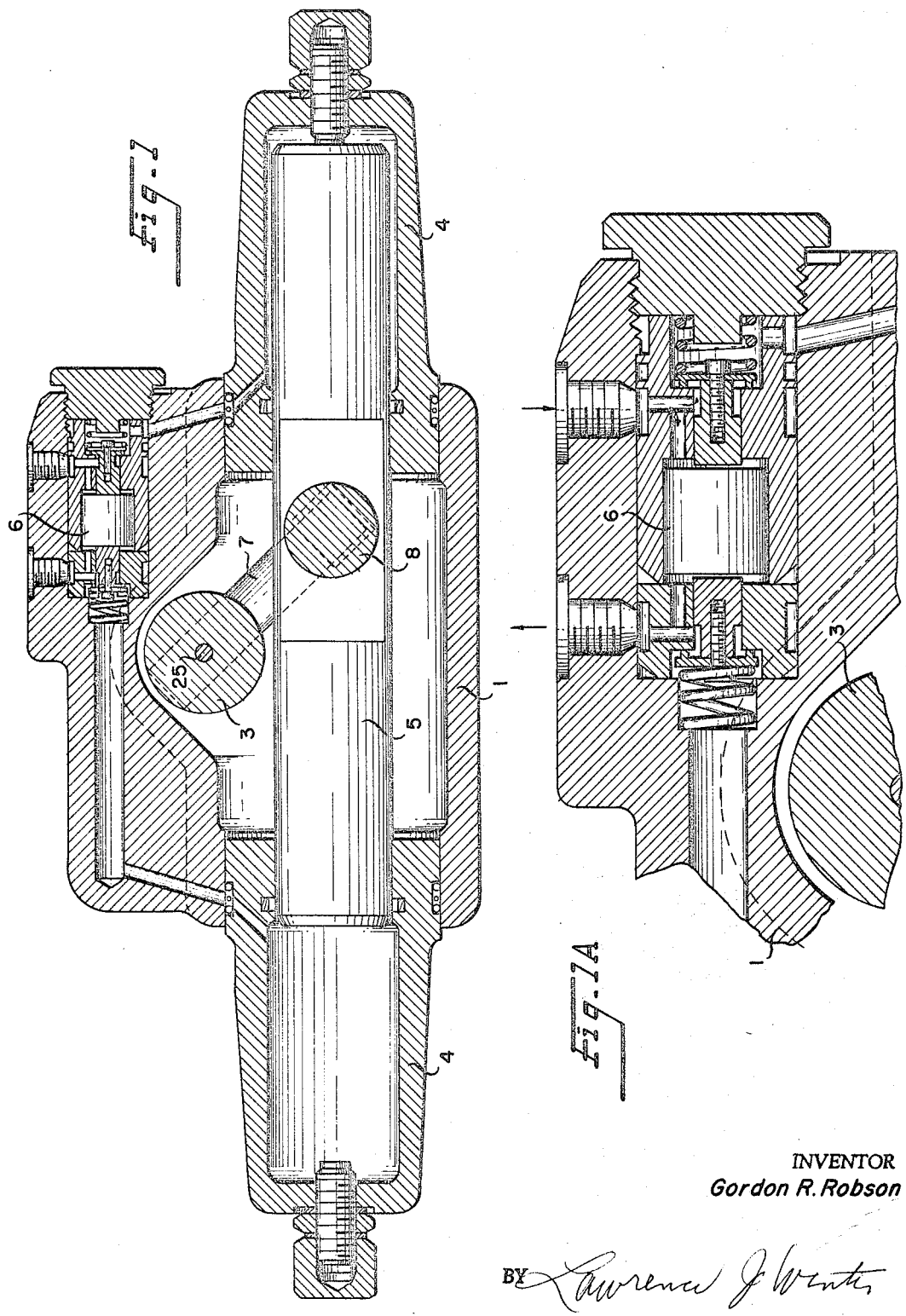

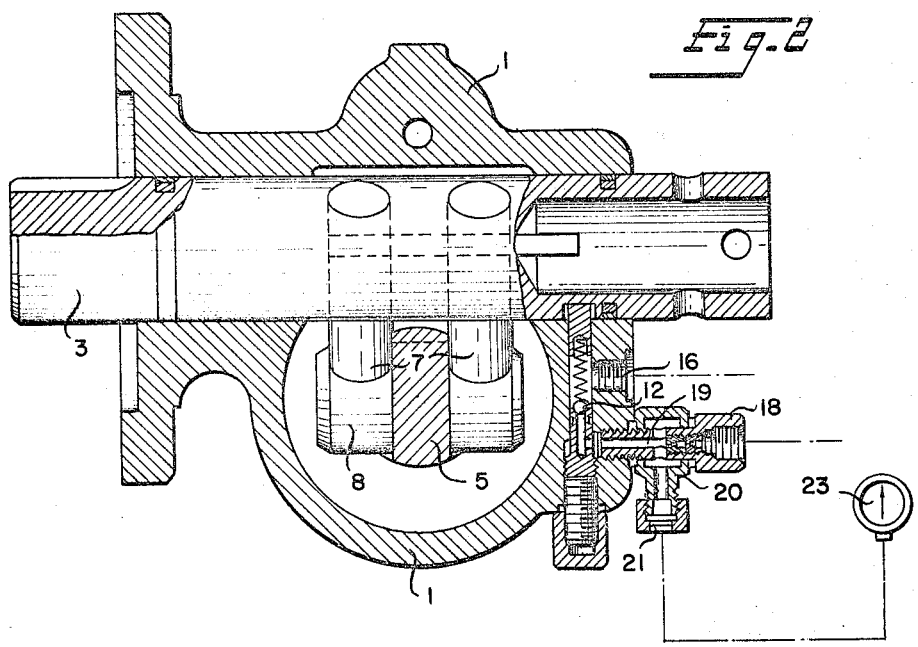
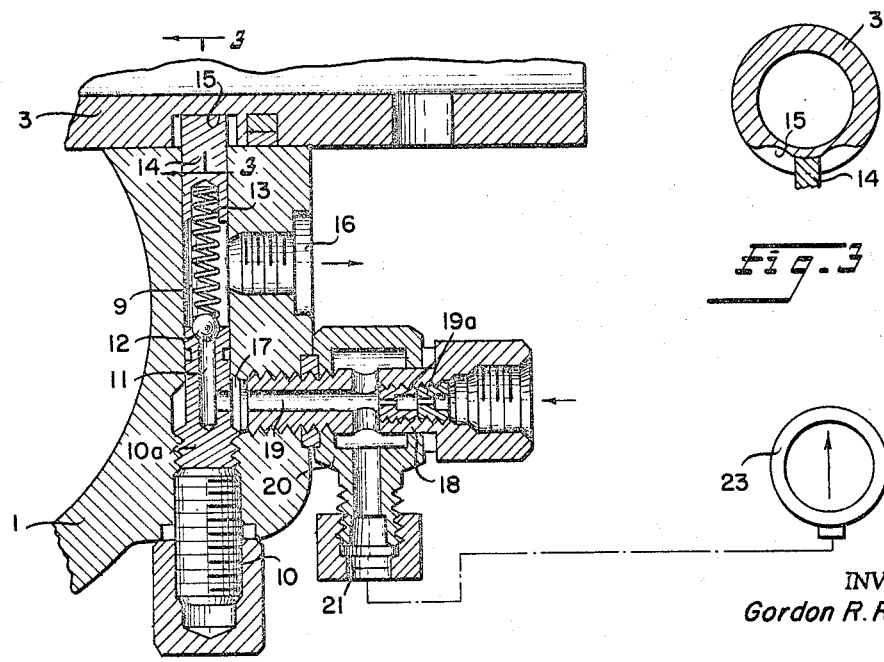

This invention relates to a position-indicating device for indicating the movement of a member from one position to another.

A position-indicating device according to the invention comprises a spring loaded relief valve for controlling the supply of pressure fluid to a pressure gauge and a plunger adapted to be operatively associated with a member the position of which is to be determined, so as to be operable by a cam carried by the member and upon movement of said member from one position to another to vary the spring loading of the valve, whereby the pressure gauge is actuated to give an indication of the position of the member.

The device of the present invention can be used to indicate linear or angular movement of a movable member, so that by suitable calibration of the scale of the pressure gauge a direct reading of the function to be indicated can be obtained.

In the drawings:

FIGURE 1 shows the actuator in section;

FIGURE 1A is an enlarged fragmentary view of the valve means shown in FIGURE 1.

FIGURE 2 is a transverse section of FIGURE 1, this figure showing also the indicating device.

FIGURE 2A is an enlarged fragmentary view of the valve means shown in FIGURE 2.

FIGURE 3 is a cross section illustrating the cam surface taken along the line 3—3 of FIGURE 2A.

The actuator comprises a casing 1 having plain bearing bores 2 supporting a rotatable output shaft 3. A pair of fluid pressure cylinders 4 project outwardly from opposite sides of the casing 1, the cylinders being arranged in alignment with one another with their axes at right angles to the axis of rotation of the output shaft 3. A piston 5 extends between the cylinders, the piston being movable axially in one direction or the other by the admission of pressure fluid from a source of supply to one or the other of the cylinders 4, the supply of pressure fluid to the cylinders 4 being controlled by valve means incorporated in the casing 1 and denoted generally by the reference numeral 6. The piston 5 is connected to the output shaft 3 by coupling means comprising a pair of arms 7 each of which is rigidly secured by one end to the output shaft 3 so as to extend radially therefrom, the radially outer ends of the arms being slidably connected to a trunnion 8 carried by the piston 5. The arrangement is such that by the admission of pressure fluid to one or the other of the cylinders 4, the other cylinder being opened to drain, the piston 5 is displaced by the pressure fluid, the axial movement of the piston 5 resulting in rotary movement of the output shaft 3.

The position-indicating device of the present invention is used in combination with the actuator to give an indication of the angular position of the output shaft. The indicator-device includes a relief valve which is incorporated in the casing 1 of the actuator. As shown in FIGURE 2, a portion of the casing 1 is formed to provide a valve body having a through bore 9 the axis of which is at right angles to the axis of rotation of the output shaft and in alignment therewith. At its outer end, the bore 9 is threaded to receive a threaded bush 10a having an axial drilling 11 extending for a portion of its length from the inner end thereof. The bush is locked in position by a closure plug 10. The inner end of the bush forms a seating for a ball 12 which is spring loaded so as to be held in the seated position by a compression spring 13 one end of which bears against the ball, the opposite end of the spring bearing against the adjacent inner end of a plunger 14 which is axially slidable in the bore 9, the outer end of the plunger bearing against an annular cam 15 machined in the periphery of the output shaft 3. When seated the ball 12 closes off communication between ports 16 and 17 in the valve body. The port 17 is threaded to receive a connector 18 having an axial passage 19 extending therethrough, the inner end of which passage 19 communicates with the axial drilling 11 in the bush 10a, the outer end of the connector being adapted for connection to a source of pressure fluid. The connector 18 holds a banjo unit 20 in position the outlet 21 of the banjo unit being adapted for connection to a pressure gauge 23. The interior of the banjo unit is open to the axial passage 19 of the connector 18 through radial drillings 22 through the wall of the connector.

In use the outer end of the connector 18 is coupled to a source of pressure fluid, and the port 16 to drain, the pressure gauge shown diagrammatically at 23 being connected to the outlet 21 of the banjo unit 20. Means are provided for damping out pressure line fluctuations. Such means comprises a threaded portion of the axial passage 19 into which two bushes 19a are screwed. Accordingly, any rotation of the output shaft 3 will cause cam 15 to cause axial movement of the plunger 14 whereby the spring loading on the ball will be varied, any such variation being indicated on the pressure gauge. By calibrating the scale of the pressure gauge to show angular movement, a direct reading of the angular position of the output shaft 3 can be obtained. The pressure gauge can be installed at a position remote from the valve, thus permitting the indicating device to be used in an installation wherein the member, the position of which is to be indicated is located in a position which is normally inaccessible.

Initial adjustment of the spring loading on the ball 12 can be effected by adjustment of the bush 10a.

I claim:

A position indicating device for indicating the movement of a member from one position to another comprising, a housing with a linearly movable plunger therein, a rotatable shaft disposed in said housing and adjacent said plunger, arm means having one end slidably connected to said plunger and the other end of said arm means fixed to said shaft to cause rotation of said shaft upon linear movement of said plunger, valve bore means in said housing in communication with the outer surface of said rotatable shaft, a valve seat in said bore means, a valve adapted to seat on said valve seat, a cam surface on said rotatable shaft adjacent said bore means, a valve control plunger slidably disposed in said valve bore means and having an end in contact with said cam surface, a spring biasing means disposed in said valve bore means between said valve and valve control plunger in contact with said valve to urge said valve to a seated position on said valve seat, a fluid pressure line having one end in communication with said valve bore means adjacent the side of said valve seat away from said control plunger, means for supplying fluid pressure to said fluid pressure line on said one side of said valve seat away from said control plunger, a fluid pressure actuated indicator member in communication with said fluid pressure line for indicating the linear position of said linearly movable plunger, and a fluid pressure drain outlet in communication with said valve bore means adjacent said spring biasing means and on the same side of said valve as said biasing spring means and side control plunger to permit unseating of said valve from said valve seat and bleeding of fluid pressure from said fluid pressure line when said valve is unseated, said linearly movable plunger causing said rotatable shaft and its cam surface to rotate to cause said slidable control plunger to ride on said cam surface and said biasing spring means to reduce the force acting on said valve so it unseats, whereby the pressure in said line is reduced and said indicator member gives a reading of the linear position of said linearly movable plunger.

References Cited

UNITED STATES PATENTS

| | | | |
|---|---|---|---|
| 2,103,324 | 12/1937 | Down | 116—65 |
| 2,704,047 | 3/1955 | Lushenko | 116—127 |
| 2,868,155 | 1/1959 | Phillips | 116—124 |
| 2,889,780 | 6/1959 | Benford | 116—117 |
| 3,146,757 | 9/1964 | Heymann et al. | 116—70 |

LOUIS J. CAPOZI, *Primary Examiner.*